June 23, 1964  E. L. FORD ETAL  3,138,652
CAPACITOR WITH AN INTERNAL GAS BARRIER
Filed April 13, 1961

INVENTORS
Elmer L. Ford
Ralph E. Hampy
BY

Attorney

United States Patent Office 3,138,652
Patented June 23, 1964

3,138,652
CAPACITOR WITH AN INTERNAL GAS BARRIER
Elmer L. Ford and Ralph E. Hampy, Albuquerque, N. Mex., assignors, by mesne assignments, to the United States of America as represented by the United States Atomic Energy Commission
Filed Apr. 13, 1961, Ser. No. 102,899
2 Claims. (Cl. 174—12)

The present invention relates generally to capacitor devices of the sort which employ a container enclosing a liquid-immersed capacitor element and more particularly to means for maintaining or isolating a quantity of gas in a definite and desired location within the containers of such capacitor devices.

With some capacitor devices of the type referred to it is desirable to provide an air or gas space or pocket within the container so that expansion or contraction of the liquid will not cause undue strain on the container, which is normally made of material having a lower expansion coefficient than the liquid. If the air or gas is free to move about within the container as the orientation or the position of the container is changed the gas may in some instances expose active elements (for example, conducting layers of interleaved conducting and dielectric convolutions) and effect objectionable lowering of breakdown voltages.

Another disadvantage of permitting gas to move about within a capacitor container and throughout the liquid of the device is an "aging" problem, that is, a gradual decrease in electrical breakdown strength, particularly at low temperatures, as the capacitor device becomes older or "ages." This gradual decrease in electrical breakdown strength is believed attributable to gradual absorption by the liquid or the "impregnant" of gases from the air pocket. After filling the containers with desired amounts of liquid, the capacitors may be pressurized and hermetically sealed. When a sealed container is at room temperature the internal pressure may be about 16 to 19 pounds per square inch absolute. The container may flex somewhat so that variation of about 12 to 25 pounds per square inch absolute may be attained over a temperature range. The noted absorption causes a gradual reduction of pressure within the sealed container to where a pressure of only 10 to 12 pounds per square inch absolute may remain at room temperature. At some cold temperature the internal pressure may be as low as 5 to 6 pounds per square inch absolute and, in addition, contraction of the fluid because of its higher coefficient of expansion than the container, may cause even further lowering of the internal pressure at low temperatures. Thus, objectionable gas type discharge may occur from conducting foil to foil or from foil to container.

The present invention aims to overcome or minimize the above and other difficulties or disadvantages by providing a capacitor device with means adapted to maintain a gas or air at a desired location within the capacitor container as indicated by the following noted general objectives.

The main object of the present invention is to obviate or substantially minimize the above problems by providing a novel gas separator or barrier which inhibits the free movement of the gas about the interior of a capacitor container.

Another object is to provide a gas-liquid separator which normally allows liquid to pass therethrough but prevents or hinders the passage of gases.

A further object is to provide a gas separator or barrier which is relatively simple and inexpensive to fabricate and does not interfere with the normal processing or operation of a capacitor device.

A still further object of the invention is to provide means for minimizing absorption of gases by the immersing liquids of capacitor devices.

Other and further objects of the invention will be obvious upon an understanding of the illustrative embodiment about to be described, or will be indicated in the appended claims, and various advantages not referred to herein will occur to one skilled in the art upon employment of the invention in practice.

Preferred embodiments of the invention have been chosen for purposes of illustration and description. The preferred embodiments illustrated are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 2:
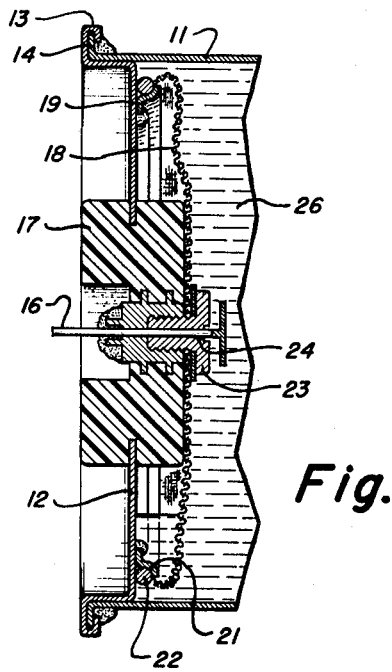
FIG. 2 is a sectional view of end plate of the capacitor device illustrated in FIG. 1.
Figure 1:
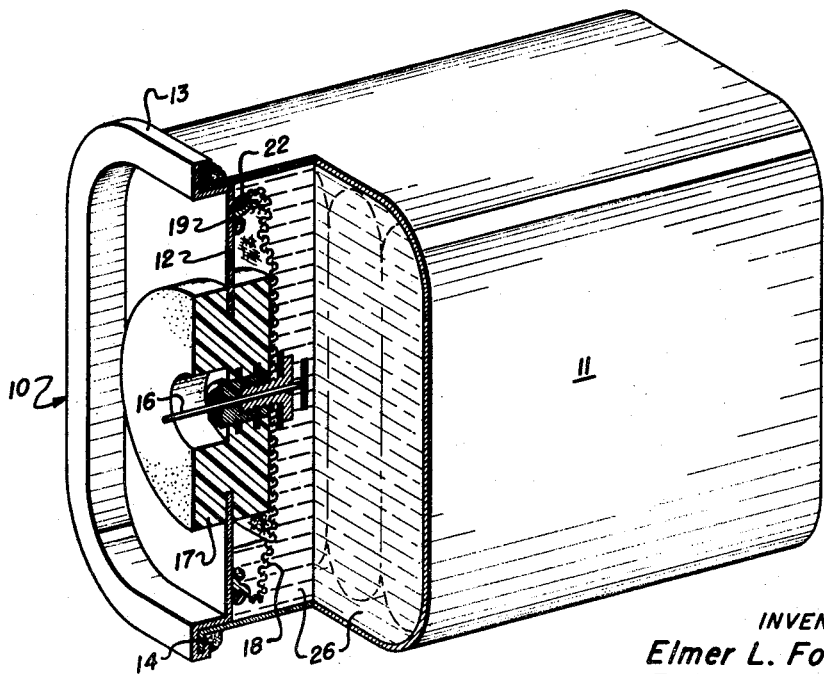
FIG. 1 is a perspective view, partly broken away, of a capacitor device embodying the present invention.

Referring now to FIGS. 1 and 2 a capacitor device embodying the present invention is generally indicated at 10. The capacitor device comprises a container 11, normally made of thin metal, which houses a conventional capacitor element or component, such as, for example, interleaved layers or convolutions of metal foil separated by paper dielectrics. In accordance with normal practice the capacitor element may be immersed in a suitable liquid, or "impregnant," e.g., some basically polyisobutylene liquid. A cover or end plate 12 may be attached and sealed to the container 11 by crimping a portion of the peripherally extending lip 13 over an annular rim or shoulder 14 on the container 11. However, any suitable means of attaching the end plate to the container may be readily used. The end plate 12 normally contains a centrally disposed high voltage or other terminal 16 which is insulated from the end plate 12 by a relatively thick annular insulating bushing 17 which may be attached and sealed to the end plate 12 and the terminal 16 in any suitable manner.

As previously noted, it is desired to provide a suitable gas or air retaining pocket within the sealed container and to do this without necessitating major redesign of a capacitor device. It has been found that this objective may be achieved by utilizing the inwardly disposed face of the end plate 12 to provide a surface within the container against which the air pocket may be permanently positioned without interfering with the operation of the capacitor. It has also been discovered that a barrier, membrane or separator 18 of one or more layers of woven cloth made of, for example, glass cloth or cotton cloth, provides a highly suitable gas retainer that may be attached in spaced relationship to the inner face of the end plate 12 by providing the back side of the end plate 12 with an annular retaining rim 19.

Marginal portions of the separator or membrane 18 may suitably be attached to the rim 19 by placing a peripheral portion of the separator 18 over a groove 21 that encircles the rim 19 and then securing the separator 18 in such position by a retaining wire 22 or the like which, when placed over the separator 18 adjacent the groove 21 pulls the separator 18 into the groove 21, but preferably leaving at least some "central" portions flexible and loose fitting so as to accommodate any fairly rapid pressure or volume changes much in the manner of a bellows. A small flat-headed screw 23 may be passed through the center of the separator 18 and engage internal threads on the high voltage terminal 16 so as to provide the latter with an electrical path through the separator 18 and also serve as an additional separator 18 fastening point. The screw 23 is preferably provided with a centrally located bore 24 for the passage of the high voltage terminal 16.

Figure 3:
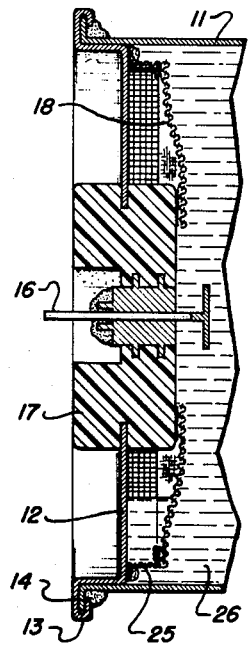
FIG. 3 is a sectional view of a different embodiment of the present invention attached to a slightly modified end plate.

In FIG. 3 a modified barrier or membrane is shown. This modification differs from the embodiment illustrated in FIGS. 1 and 2 by providing a membrane consisting of a fine mesh screen 25 in place of the retaining rim 19 and attaching the screen to the end plate 12 by a suitable joining means, such as, for example, soldering or the like. The cloth separator or membrane 18 may then be attached to the screen by a suitable bonding agent.

Since the cloth separator may be made of non-conducting material it may be attached to the high voltage terminal by the screw 23. If however, it is desired to isolate the high voltage terminal 16 from the cloth separator 18, the latter may be attached to the insulating bushing 17 by a cementing medium or the like.

In some instances it may be desirable to replace the cloth separator 18 with a separator made entirely of the fine wire screen (not shown). Then, of course, the screen should be attached to the insulating bushing 17 so as to prevent the terminal from coming into contact with the screen. Also, it may be desirable to place a small spring (not shown) between the separator 18 and the end plate 12, thus forming a bellows arrangement which aids in positioning the separator.

The cloth separator 18 may comprise two layers of combed, singed, washed and peroxide bleached cotton sateen having small openings or perforations, e.g., as provided by such cloth having about 96 x 160 threads per inch. When using glass cloth as a separator, or using a wire screen, openings therethrough should be of a size comparable to the noted cotton separator material. While cotton, glass and fine wire screen give excellent results, it will be obvious to others when practicing the invention to use any separator or membrane material in any number of layers which satisfactorily attains the desired results.

It is believed that the theory of operation of the separator and gas pocket is that the wetted separator or membrane 18 is impervious to gas but not to the liquid in the container 11. The barrier membrane should be "wet" by the liquid involved. For example, in capacitor applications the "wetting" would be normally performed by the liquid which substantially fills the capacitor container. Such "wetting" of the membrane 18 fills the small openings in the membrane 18 with the liquid 26 from the container 11, which brings about a surface tension. Capillary action assists in keeping the separator wetted. Thus, the liquid on the separator and within the separator openings serves as a barrier to the gas phase, but does not prevent the liquid from passing from one side of the separator to the other through the openings.

Liquids with low viscosity would preferably be accommodated by employing separators with holes or openings of smaller size than where liquids of high viscosity are utilized. The appropriate combinations, including separator thicknesses or number of layers, for various conditions will be clear to persons skilled in the art from the accompanying description.

The gas will tend to remain on one side of the membrane unless sufficient differential pressure from one side of the membrane to the other is built up to overcome the pressure due to the surface tension of the liquid. Under static conditions, the differential pressure will be merely the hydrostatic "head" of liquid. If the container were to be subjected to dynamic conditions, such as, for example, rapid pressure changes caused by shock or vibration, the viscosity of the liquid may be taken into consideration in determining the particular size of openings through the membrane.

After the end plate is provided with a barrier membrane and attached to the container, all as described above, the impregnating fluid, which may be of any suitable type, such as, for example, a fluid which is basically polyisobutylene, may be put into the container through a small opening in the end plate 12, since it is possible to impregnate right through the openings in the barrier membrane. After the container has been filled to a desired level with the fluid, it may be pressurized and closed, thus hermetically sealing the container as briefly described above.

It will be seen that the barrier or membrane construction of the present invention provides a highly advantageous device in that electrical connections may be made through the membrane by the use of eyelets or feedthrough connections and that the cost of providing capacitors or the like with barriers is relatively low. An air bubble provides for expansion and contraction of the impregnant liquid and internal elements and yet the air bubble is kept away from the capacitor elements. Liquid may readily pass through the separator but not gas, except under some differential pressure greater than surface tension of the liquid. The disclosed improvements have been found to perform well in actual practice and to provide capacitor devices superior to those which do not embody the separator constructions. While the invention has been described chiefly with reference to its use in a capacitor device it will be clear that it may be employed in any other device or situation where generally similar problems are encountered.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. In a capacitor device of the character described, the combination of a container, a liquid substantially filling available space within said container, an end wall secured to said container having a centrally disposed aperture therethrough, an annular insulating member carried by said end wall and penetrating said aperture having a supporting surface spaced inwardly of the container from said end wall, an annularly disposed retaining shoulder carried by said end wall and projecting into the container encircling said annular insulating member and spaced radially outwardly therefrom and having a recess thereabout, a yieldable fluid permeable membrane having peripheral portions overlapping said shoulder, a retaining member clamping said peripheral overlapping portions in said recess, means securing the yieldable membrane against said supporting surface of the annular insulating member at a location adjacent and spaced from said annularly disposed retaining shoulder, said yieldable membrane intermediate the retaining shoulder and adjacent marginal portion of the annular insulating member forming an annular fluid permeable gas retaining channel wall and having a radially disposed width greater than the shortest distance between said retaining shoulder and adjacent marginal portion of the annular insulating member and embodying slack in said intermediate portion whereby the permeable membrane is free to flex in response to fluid pressure changes within said container.

2. In a capacitor device as claimed in claim 1 wherein the yieldable fluid permeable membrane comprises woven cloth material.

References Cited in the file of this patent

UNITED STATES PATENTS

| | | |
|---|---|---|
| 2,568,422 | Wald | Sept. 18, 1951 |
| 2,816,687 | Phillips | Dec. 17, 1957 |

FOREIGN PATENTS

| | | |
|---|---|---|
| 1,211,462 | France | Oct. 12, 1957 |